3,455,319
CONTROL APPARATUS

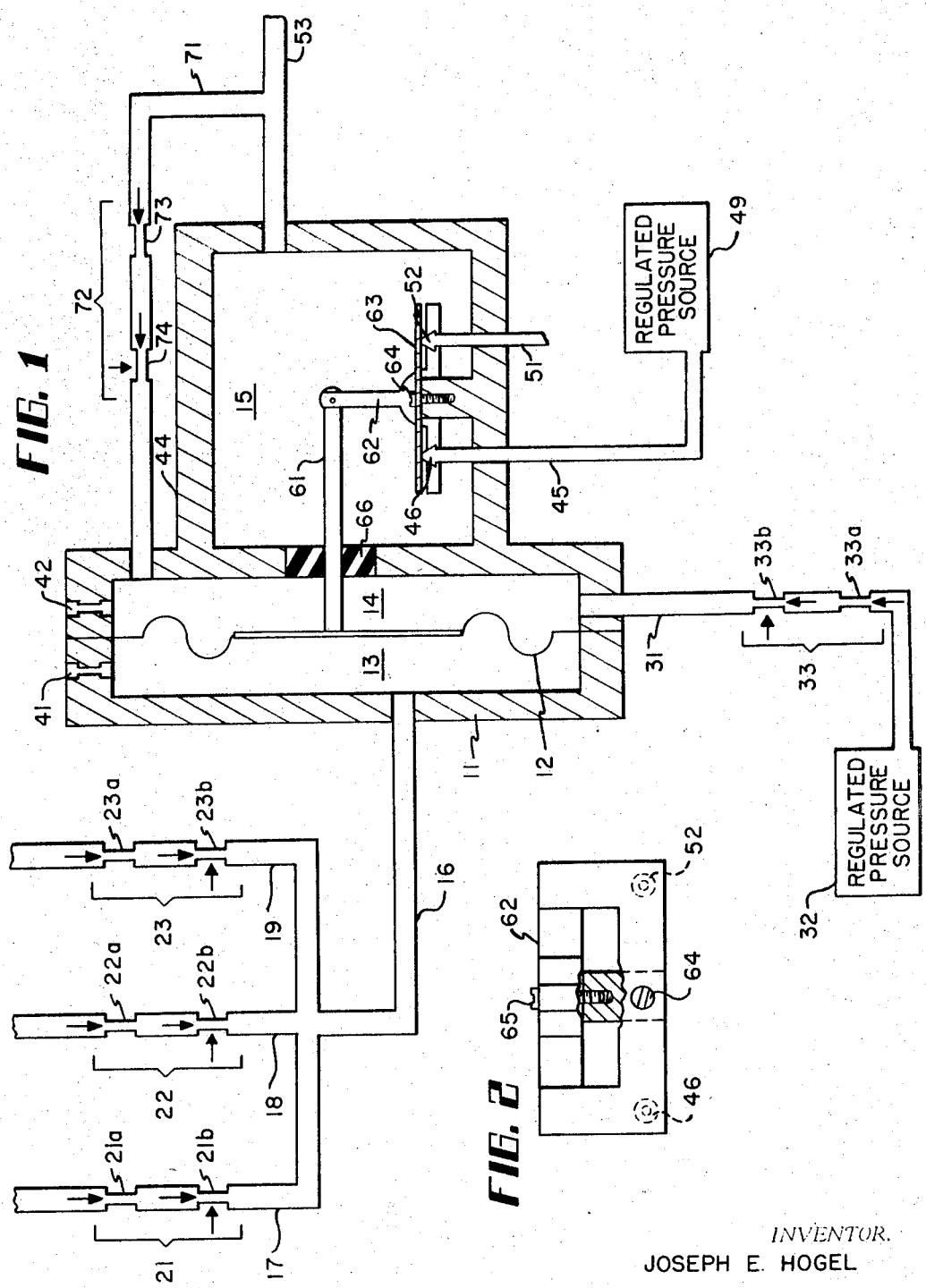

Joseph E. Hogel, River Grove, Ill., assignor to Honeywell Inc., Minneapolis, Minn., a corporation of Delaware
Filed Dec. 22, 1966, Ser. No. 603,821
Int. Cl. F15b 5/00, 21/00; G05d 16/00
U.S. Cl. 137—85                               7 Claims

ABSTRACT OF THE DISCLOSURE

A fluid controller that employs constant bleed restrictions in both the signal and reference pressure chambers. The controller has the capability of accepting a plurality of variable pressure signals without the necessity of scaling or normalizing the signals. The authority of each input signal is controlled by adjustment of a simple variable restriction in its respective signal conduit.

---

The invention involves a fluid pressure controller that is adapted to receive one or more input pressure signals which are combined into an integrated signal, compared with a reference pressure and thereafter amplified to establish a modulated output pressure.

The essence of the invention lies in the use of relatively high fluid resistances in the respective input pressure signal lines and the reference pressure input line, and exhaust restrictions in the control and reference pressure chambers. This results in relatively low operational pressures in both chambers, the difference of which is easily sensed by a large diaphragm. Because the operational pressures downstream from the input resistances are relatively low, they appear essentially constant to the higher signal pressures upstream from the input resistances, thus making it more practical to utilize linear restrictions for the input resistances. If the linear restrictions are made adjustable, the effectiveness or authority of each input pressure signal can be controlled with respect to the other input pressure signals. Likewise, the input reference pressure can be adjusted to provide a desired set point. These simple, variable restriction adjustments are made possible by the use of the exhaust restrictions in the control and reference pressure chambers, which allow a continuous pressure bleed. Without them, pressure on either side of the input resistances would equalize, negating the effect of the respective adjustable restrictions.

In the drawings:

FIGURE 1 is a partly schematic and partly diagrammatic representation of a fluid pressure device incorporating the inventive concept.

FIGURE 2 is a top view of a valving mechanism for the fluid pressure device.

In FIGURE 1, a sealed housing 11 is divided by a diaphragm 12 to define a control pressure chamber 13 and a reference pressure chamber 14. Leading into control chamber 13 is an inlet tube 16, which is commonly connected to three pressure signal input tubes 17, 18, 19. The incoming pressure signals in input tubes 17, 18, 19 each undergo a pressure drop by means of adjustable linear restrictions shown generally at 21, 22, 23. The adjustable linear feature is obtained by placing a linear restriction in series with an adjustable restriction, matching the respective flow characteristics of the restrictions to bring about linearity over the desired operating range. The linear restrictions are shown here at 21a, 22a, 23a, and the respective adjustable restrictions are shown at 21b, 22b, 23b.

Leading into the reference chamber 14 is an inlet tube 31, which is connected to a regulated pressure supply 32. The regulated pressure also undergoes a pressure drop through an adjustable linear restriction 33, which comprises linear restriction 33a and an adjustable restriction 33b.

Provision is made for a continuous pressure bleed from control chamber 13 and reference chamber 14 by means of exhaust restrictions 41 and 42. For proper operation, exhaust restriction 41 is chosen to have a resistance value lower than any of the restrictions 21, 22, 23. Likewise, exhaust restriction 42 is chosen to have a resistance value lower than that of restriction 33. While exhaust restriction 41 is shown leading from control chamber 13, it is obvious that it can be placed anywhere downstream from the adjustable linear restrictions 21, 22, 23. Likewise, exhaust restriction 42 can be placed anywhere downstream from the adjustable linear restriction 33.

Enclosed housing 44 is disposed adjacent housing 11 and defines a modulated output pressure chamber 15. A supply inlet 45 in housing 44 receives a supply of pressure from a regulated pressure source 49 and conducts it to a nozzle 46, which lies within chamber 15. A pressure exhaust outlet 51 opens into chamber 15 through a nozzle 52. Leading from chamber 15 is a modulated pressure outlet 53, which can be connected with a pressure actuated device.

The valving mechanism, which is also seen in FIGURE 2, consists of a connecting link 61, a T-shaped member 62, and a flapper 63. Link 61 passes from chamber 15 to chamber 14 through a pressure seal 66 and is attached to diaphragm 12. Member 62 is pinned to link 61 and rotatably mounted on housing 44 by means of a screw 65, as shown in FIGURE 2. Flapper 63 is fastened to housing 44 by a screw 64, so that it extends in cantilever fashion over both nozzle 46 and nozzle 52. Flapper 63 is sufficiently biased towards nozzles 46, 52 to close them simultaneously while in a balanced condition. Member 62 is disposed beneath the extended portions of flapper 63 so that it may alternately lift flapper 63 from nozzles 46, 52 in accordance with its direction of rotation. This valving mechanism is quite conventional, and its function could easily be carried out by similar devices.

A feedback pressure line 71 connects modulated pressure outlet 53 with chamber 14. It also includes an adjustable linear restriction 72 comprising a linear restriction 73 and an adjustable restriction 74, which is used as a gain control.

In operation, a reference or set-point pressure is established in chamber 14 by adjusting restriction 33b. Each of the signal input tubes 17, 18, 19 is connected to some type of pressure transmitting device, such as a condition sensor or a remote set-point adjustment. The variable input pressure signals coming from the transmitters undergo an appreciable pressure drop through adjustable linear restrictions 21, 22, 23, and are thereafter combined to establish a control pressure in chamber 13. Adjustable restrictions 21b, 22b, 23b can be adjusted to determine the relative effectiveness of any one point signal as compared to the overall signal. The pressures in chambers 13 and 14 are kept at a relatively low operational level by means of exhaust restrictions 41 and 42, which provide a continuous bleed therefrom. The difference between the reference pressure and control chamber pressure is sensed and measured by diaphragm 12, and the valving mechanism is positioned accordingly. If control pressure exceeds reference pressure, control chamber 13 expands and drives link 61 to the right, lifting flapper 63 from nozzle 46 to admit supply pressure and increase the modulated output pressure. Nozzle 52 remains closed during this operation. If reference pressure exceeds control pressure, chamber 14 expands and drives link 61 to the left. This causes member 62 to lift flapper 63 from nozzle 52 while nozzle 46 remains closed, thereby bleeding part of the pressure in chamber 15 to atmosphere and reducing the modulated output pressure. The feedback line 71 allows a desired proportion of the modulated output pressure passing through outlet 53 to communicate with the reference pressure in chamber 14. Because the output pressure is of a much greater magnitude than either the control pressure or the reference pressure, it must be appreciably reduced by the adjustable linear restriction 72. The feedback line 71 has the effect of stabilizing the modulated output pressure of the device by offsetting increases in the pressure difference between chamber 13, 14 in either direction.

With the control pressure inlet tube 16 and the reference pressure inlet tube 31 connected with chambers 13, 14 as shown, the device is direct acting, which means that an increase in control pressure effectuates an increase in modulated output pressure. The device can be made to be reverse acting (an increased control pressure causes a decreased output pressure) by simply switching inlet tube 16 with the inlet tube 31 so that control pressure is conducted to chamber 14 and reference pressure is conducted to chamber 13. The effect of the feedback pressure communication by line 71 to chamber 14 remains negative even though the function of the device is changed from direct to reverse acting. This can be seen if it is assumed that control pressure increases, which tends to decrease the modulated output pressure by expanding chamber 14 and driving link 61 to the left. The decreased output pressure passes through feedback line 71 and is felt by chamber 14, tending to offset the original control pressure increase.

While the expandable chambers 13, 14 are defined by housing 11 and diaphragm 12, the inventive concept can be incorporated into similar pressure responsive devices, such as the opposed chambers defined by a bellows-type device or a piston-cylinder arrangement. The large diaphragm 12 is preferred because of its great sensitivity to the relatively low pressure input signal.

The novelty of this fluid pressure device lies in the use of exhaust restrictions in the control and reference pressure chamber with adjustable input restrictions of a higher resistance value. The input restrictions and resultant low operational chamber pressures provides for low fluid consumption and enable the device to receive input signals from virtually any type of pressure transmitter. This is possible because signals of different magnitudes can be scaled down to similar operational levels before being combined into an overall control pressure. The scaling down, which is by simple, variable restrictions, is possible because of the continuous-bleed exhaust restrictions, which also enable the device to receive a plurality of input signals. The inventive concept provides a fluid pressure device of extremely good versatility, simple in design and possessing high sensitivity and pressure gain.

The embodiments of the invention in which an exclusive property or right is claimed are defined as follows:

1. A fluid controller comprising in combination:
a first expandable pressure chamber adapted to receive a variable input pressure;
first inlet means for conducting the input pressure to the first pressure chamber, said first inlet means including a linear fluid resistor means to reduce the input pressure to a predetermined operational level;
first exhaust restriction means disposed downstream from the first inlet fluid resistor means, said first exhaust restriction means being of lesser fluid resistance than the first inlet fluid resistor means;
a second expandable pressure chamber adapted to receive a reference pressure, the second pressure chamber expansion opposing the first pressure chamber expansion in such a manner that the input pressure and the reference pressure can be differentially compared;
second inlet means for conducting the reference pressure to the second pressure chamber, said second inlet means including a linear fluid resistor means to reduce the reference pressure to a predetermined operational level;
second exhaust restriction means disposed downstream from the second fluid resistor means, said second exhaust restriction means being of lesser fluid resistance than the second inlet fluid resistor means;
and relay means utilizing the difference between the input pressure and the reference pressure to proportion a regulated supply pressure and establish a modulated output pressure in accordance with the pressure difference.

2. The fluid controller defined in claim 1, wherein there is included feedback means communicating the modulated output pressure with the second pressure chamber, the feedback means including a linear fluid resistor means for reducing the modulated output pressure to a predetermined operational level.

3. The fluid controller defined in claim 1, wherein the first inlet means comprises a plurality of inlet conduits each of which conducts an independent variable input pressure to the first pressure chamber, each inlet conduit including a linear fluid resistor means to reduce the respective variable input pressures to a predetermined operational level.

4. The fluid controller defined in claim 2, wherein the first inlet fluid resistor means, the second inlet fluid resistor means and the feedback fluid resistor means are adjustable.

5. The fluid controller defined in claim 1, wherein the relay means comprises a third pressure chamber having a first opening, a second opening and a third opening;
the first opening adapted to receive the regulated supply pressure;
the second opening for exhausting pressure from the third pressure chamber;
the third opening for conducting the modulated output pressure from the third pressure chamber;
and closure means operating in sealable relation with the first and second openings, the closure member moving in response to the difference between reference pressure and input pressure to simultaneously close the first and second openings when in balanced position and to alternately open and close the first and second openings in accordance with changes in the pressure differences.

6. The fluid controller defined in claim 1, wherein the first and second expandable pressure chambers are formed by a sealed housing divided internally by a diaphraghm, the closure means of said relay means communicating with the diaphragm and thereby responding to the pressure difference between the first and second pressure chambers.

7. The fluid controller defined in claim 5 wherein:
the first opening leads into the third chamber through a first nozzle;

the second opening leads into the third chamber through a second nozzle;

the closure means comprises a flapper supported intermediate its ends so that the ends extend over the first and second nozzle in cantilever fashion, thereby sealing the nozzles when in balanced position;

and the closure means further comprises flapper actuating means that moves in response to the difference between reference pressure and input pressure, the flapper actuating means being rotatably mounted beneath the flapper to cause the flapper to alternately seal and unseal the first and second nozzles in accordance with the direction of rotation of said flapper actuating means.

References Cited

UNITED STATES PATENTS

| | | | |
|---|---|---|---|
| 2,645,240 | 7/1953 | Drake. | |
| 2,804,877 | 9/1957 | Rosenberger | 137—85 X |
| 3,129,563 | 4/1964 | Long | 137—85 X |
| 3,163,981 | 1/1965 | Goodall | 137—85 X |
| 3,266,380 | 8/1916 | Eige | 137—84 X |

FOREIGN PATENTS 925,868   3/1955   Germany.

ALAN COHAN, Primary Examiner

U.S. Cl. X.R.

137—596.18